United States Patent
Evenson, III et al.

(10) Patent No.: US 11,129,378 B2
(45) Date of Patent: Sep. 28, 2021

(54) APPARATUSES AND METHODS FOR ATTRACTING AND/OR REPELLING ANIMALS

(71) Applicant: Southern Flyway Outfitters, LLC, Cary, NC (US)

(72) Inventors: John E Evenson, III, Fuquay Varina, NC (US); Nathan L Herrmann, Cary, NC (US)

(73) Assignee: Southern Flyway Outfitters LLC, Cary, NC (US)

( * ) Notice: Subject to any disclaimer, the term of this patent is extended or adjusted under 35 U.S.C. 154(b) by 300 days.

(21) Appl. No.: 16/203,840

(22) Filed: Nov. 29, 2018

(65) Prior Publication Data

US 2019/0090474 A1    Mar. 28, 2019

Related U.S. Application Data

(63) Continuation of application No. 15/055,042, filed on Feb. 26, 2016, now Pat. No. 10,165,771.

(60) Provisional application No. 62/145,639, filed on Apr. 10, 2015.

(51) Int. Cl.
*A01M 31/06* (2006.01)
*A01M 29/06* (2011.01)

(52) U.S. Cl.
CPC ............ *A01M 31/06* (2013.01); *A01M 29/06* (2013.01)

(58) Field of Classification Search
CPC ...... A01M 31/06; A01M 29/06; A01M 29/00; A01M 31/00; A01M 31/025; A01K 71/00; A01K 73/00; A01K 73/02; A01K 73/04; A01K 73/06; A01K 73/10; A01K 74/00; A01K 75/00; A01K 69/02; B60P 7/02; B60P 7/04; B60P 7/08; B60P 7/0807; B60P 7/0823; B60P 7/0876; B60P 7/13; B61D 45/00; B61D 45/001; E06B 2009/2622

See application file for complete search history.

(56) References Cited

U.S. PATENT DOCUMENTS

| | | | |
|---|---|---|---|
| 942,103 A | 12/1909 | Rigney | |
| 1,185,164 A | 5/1916 | Batcher | |
| 2,971,284 A * | 2/1961 | Opel | A01K 74/00 43/11 |
| 4,120,110 A | 10/1978 | Aeschliman | |
| 4,362,631 A * | 12/1982 | Bocard | E02B 15/048 210/776 |
| 4,607,447 A | 8/1986 | Wright | |

(Continued)

FOREIGN PATENT DOCUMENTS

| | | | | |
|---|---|---|---|---|
| KR | 200204988 Y1 * | 12/2000 | | A01K 75/00 |
| KR | 200352988 Y1 * | 6/2004 | | A01K 75/00 |
| WO | WO-2009047213 A1 * | 4/2009 | | A01K 61/60 |

OTHER PUBLICATIONS

Machine translation of KR 200352988 to Kim et al., published Jun. 2004.*

(Continued)

*Primary Examiner* — Kathleen I Alker
(74) *Attorney, Agent, or Firm* — Coats & Bennett, PLLC

(57) ABSTRACT

Methods, systems and apparatuses are disclosed for attracting and/or repelling animals, more particularly methods systems and apparatuses for deploying and retrieving decoys, such as, for example, waterfowl decoy displays typically used in hunting, and particularly to attract overflying waterfowl.

17 Claims, 9 Drawing Sheets

(56) References Cited

U.S. PATENT DOCUMENTS

| | | | | |
|---|---|---|---|---|
| D308,715 | S | 6/1990 | Swenson | |
| 5,197,239 | A * | 3/1993 | Glynn | E04G 5/12 52/63 |
| 5,452,973 | A * | 9/1995 | Arvin | B60P 7/0876 410/117 |
| 6,634,133 | B1 | 10/2003 | Levandowski | |
| 6,851,903 | B1 * | 2/2005 | Foggy | B60P 7/0876 410/118 |
| 8,292,559 | B1 * | 10/2012 | Foggy | B60P 7/0876 410/96 |
| 9,162,805 | B1 * | 10/2015 | Testa | B65D 71/02 |
| 9,572,339 | B1 | 2/2017 | Dicken | |
| 2006/0162228 | A1 * | 7/2006 | Sieman | A01M 31/06 43/3 |
| 2006/0215940 | A1 * | 9/2006 | May | A01G 20/43 383/4 |
| 2007/0025646 | A1 * | 2/2007 | Schoenig | B65F 1/0006 383/4 |
| 2008/0301995 | A1 | 12/2008 | Brittingham et al. | |
| 2009/0314321 | A1 | 12/2009 | Van Dyken | |
| 2012/0285106 | A1 | 11/2012 | Donoho | |
| 2013/0195383 | A1 | 8/2013 | Daugs | |
| 2014/0355910 | A1 | 12/2014 | Ferris | |
| 2016/0100569 | A1 * | 4/2016 | Hudson | A01M 31/06 43/3 |
| 2017/0332621 | A1 | 11/2017 | Madas et al. | |

OTHER PUBLICATIONS

Old School Decoys Facebook page, https://www.facebook.com/oldschoolfoamdecoys/?tn-str=k*F, latest publication date relied upon: Jun. 9, 2014, accessed: Feb. 3, 2021.*
Old School Decoys, https://www.youtube.com/watch?v=25H2Vu4WTPc, published Jun. 26, 2014, accessed Jun. 28, 2018.*
Gang Net Bluebill, https://www.duckhuntingchat.com/forum/viewtopic.php?f=62&t=191751, published Jun. 29, 2012, accessed Jun. 28, 2018.*
Refuge Forums, Net Rig Decoys, http://www.refugeforums.com/threads/net-rig-decoys.591869/, published Jan. 8, 2008, accessed Jun. 28, 2018.*
The Duck Hunter's Refuge, Net Rig Decoys, http://www.refugeforums.com/threads/net-rig-decoys.591867/, published Jan. 8, 2008, accessed Jun. 30, 2018.*
Duck Hunting with Net Rigs, https://www.youtube.com/watch?v=Dek_8U14yNc, published Dec. 5, 2012, accessed Jul. 17, 2018.*
Refuge Forums, Span Diver Net Rig, http://www.refugeforums.com/threads/spam-diver-net-rig.951843/, published Sep. 19, 2013, accessed Jul. 17, 2018.*
Duck Hunting with Net Rigs, https://youtube.com/watch?v=Dek_8U14yNc, published Dec. 5, 2012, accessed Jul. 17, 2018.
Refuge Forums, Span Diver Net Rig, http://www.refugeforums/threads/spam-diver-net-rig.951843/, published Sep. 19, 2013, accessed Jul. 17, 2018.

* cited by examiner

APPARATUSES AND METHODS FOR ATTRACTING AND/OR REPELLING ANIMALS

CROSS-REFERENCE TO RELATED APPLICATIONS

The presently disclosed subject matter is related to and claims priority to U.S. Non-Provisional patent application Ser. No. 15/055,042, filed Feb. 26, 2016 and entitled "Apparatuses and Methods for Attracting and/or Repelling Animals", and issued Jan. 1, 2019 as U.S. Pat. No. 10,165,771, that, in turn, is related to and claims priority to U.S. Provisional Patent Application No. 62/145,639 filed Apr. 10, 2015 and entitled "Apparatuses and Methods for Attracting and/or Repelling Animals" the entire disclosures of which are both incorporated herein by reference.

TECHNOLOGICAL FIELD

The present disclosure relates generally to apparatuses and methods for attracting and/or repelling animals. More particularly, the present disclosure relates to apparatuses and methods for deploying and retrieving decoys, such as, for example, waterfowl decoy displays typically used in hunting, and particularly to attract and/or repel overflying waterfowl. Still more specifically, the present disclosure relates to the use of a rigging device for a more efficient and predictable display of multiple decoys, or a decoy array, in a tight configuration to help reduce tangles, make better use of a hunter's time and labor, and provide a better, realistic and safer display of multiple waterfowl decoys configured together, particularly on the open water.

BACKGROUND

Hunters have been using artificial means and methods to attract overflying waterfowl for years. Waterfowl can be attracted by both sight and sound. One method of attraction used by hunters has been the use and display of artificial waterfowl ("decoys") floating on open bodies of water.

In earlier years, hunters (users) displayed "decoys" carved out of wood. Later, decoys were constructed using plastic materials. The decoys are typically built to the approximate size of an actual waterfowl, and then painted and designed to be displayed, and look like an actual duck. Typically, a user will set up in a location known to have ducks flying overhead. The user will typically either hunt from a boat, or from a concealed location on land that overlooks a body of water.

In order to attract the waterfowl to their position, the user will employ a variety of decoy rigs, or arrays, to display decoys. A decoy "rig" is understood to be either an interconnected series of multiple decoys, (a decoy array), or a collection of individual or solitary decoys located relatively closely to one another, but that are not interconnected. The user will either wade out from the shoreline and place the decoy rig in shallow water, or drop/throw the decoy rigs from their boat into deeper water.

One method used by hunters has been to put out solitary duck decoys on the open water, which are anchored in place under the water by a cord, or monofilament line, attached to a small weight. Another method employed by the user has been to put out a "longline" (also known as a "gang rig") with multiple decoys attached, or interconnected, at various intervals along a longer rope that is anchored in place. In addition, hunters will use makeshift/homemade "net rigs" to give the appearance of a tighter configuration of ducks feeding on the open water. Still another method employs what is referred to as a "jerk rig." Each will be explained in greater detail below.

Generally, the more decoys a user can display, the more likely it is that overflying waterfowl will see the decoys and perceive the decoys to be actual ducks congregating together to feed, etc. Thus, the overflying waterfowl are thereby lured to fly toward the decoys and within shooting range of the user. Once the user shoots a duck, they can deploy a trained dog to swim/run and retrieve the duck. Often, actual ducks will congregate together in a close, tight configuration to form a "raft" out on the open water. The ducks will raft together in tight proximity both before and after feeding. Typically, these rafts are formed in water that is too deep for wading by the hunter. Users have long desired to mimic this tight feeding configuration by using their own makeshift decoy rigs to display duck decoys.

One method hunters have used to create the tight rafting effect of ducks is by throwing individual decoy rigs close together in the water. The individual plastic decoy is anchored using monofilament line or cord and a lead weight on the end. Often, throwing (deploying) the decoys from a boat is required because the depth of the water is over the head of the hunter. When these individually thrown (deployed) decoys land in the water, if they should land too close to each other, they can frequently tangle because of the long cords, water currents, and wind. As a result, it is difficult for users to achieve the desired look of rafting ducks using the individual duck decoy displays.

Users also display multiple decoys by use of "longline" cords (gang rigs). The longline rig typically consists of a small line, such as, for example, a rope or paracord that is approximately fifty feet (50') to one hundred feet (100') or more in length. The rope is then attached to a suitable anchor (typically from about 3 to 5 lbs. in weight) on each end. Decoys are placed and attached at various intervals along the rope using metal clips and approximately three feet (3') of leader. Using the longline method, the hunter is required to clip these decoys onto the line, and then drop the line into the water, either from a boat, or by wading out into a body of water and dropping them as they walk. There are problems with this method. It is difficult to display the decoys in a tight configuration without tangles developing in the line and among the decoys. The decoys are typically spaced four or more feet apart along the line, to keep them from becoming tangled. Typically, one end of the longline rig is anchored close to a tight group of separate decoys in a "net rig." Passing ducks will see the decoys along the longline and "follow" it to what appears to be a group of ducks feeding. The longline rig is a useful way of deploying a lot of decoys quickly, but it does not achieve the tight rafting of ducks, as the decoys are typically four or more feet apart, and in a direct line.

An additional method, which is quite similar to the longline in decoy appearance, is the "jerk rig" method. This setup typically involves using only 3 to 4 decoys and a cord approximately twenty-five feet (25') in length. The decoys are attached to the cord via clips that are spaced approximately four feet apart on the cord. The rig is then anchored on one end of the cord. Affixed between the anchor and the long line is a bungee cord. The hunter can then stand on the bank and pull or "jerk" the line. The bungee cord allows the four decoys to "swim" one way when the user pulls the cord, and then turn and "swim" the other way when the user lets go and the bungee pulls in the opposite direction. This method is not designed to mimic a "raft" of ducks, but is used to create the appearance of ducks in motion. This method is not generally used in open water hunting but is typically reserved for hunting in a swamp or among flooded timber. Ducks that frequent swamps or flooded timber areas are not known to "raft" up in the large numbers, as do ducks on open water.

The method used most by hunters to create the appearance of a close configuration of rafting ducks has been the conventional makeshift "net rig." This method is concentrated primarily in eastern North Carolina and southern Virginia, as it was originally developed by commercial fisherman who used their old fishing nets. Normally, the user will obtain a commercial nylon or monofilament fishing net with a mesh opening size of ½ inch or more. The user then must individually attach dozens of decoys onto the fishing net, normally by using plastic zip ties. A standard plastic decoy is constructed with a ballasted keel underneath for assisting in maintaining its flotation on the water in an upright position. On a net rig, the user zip ties the decoy on both ends of the decoy keel and then has to attach it to the fishing net to prevent the decoy from moving and tangling. Because the decoy is attached on both ends of the keel, the decoy is not able to move and adjust to the water current as freely as one that is attached on just one end of the keel. Upon attaching the decoys to the net, the user must then thread a small rope around the perimeter of the net and attempt to make the net taught. Several loops must be tied in the perimeter rope to serve as corner attachment points for the anchors ropes. The user is then required to attach suitable (3 to 5 lbs.) anchors to at least four separate anchor ropes, and then tie the opposite end of each rope to each of the aforementioned loops in the perimeter rope. The upwind side of the net rig will require two (2) Danforth anchors, while the downwind side can use two (2) mushroom anchors. The user must first deploy both of the Danforth anchors by throwing the anchors in opposite directions, substantially simultaneously (therefore requiring the presence and work of at least two people). Once the Danforth anchors are settled and firmly anchored, the user will maneuver the boat down current. The user will then need to throw the two mushroom anchors as far apart as possible, in opposite directions. Deploying the net rig in this manner will provide the best chance for the net to remain taught. A taught net helps prevent the decoys from bunching together so tightly that they begin bumping into each other, and becoming entangled. Multiple anchors must be used because the standard fishing net is not made to be tight, but is rather designed to be loose in order to trap fish. As a result, the conventional makeshift/homemade net rig takes considerable effort to deploy, to achieve the desired look of rafting ducks. Deploying such a net rig can take twenty to forty minutes, or more, depending on the size of the net rig. Further, performing such a deployment in the early morning darkness can prove challenging, especially in challenging conditions such as, for example, high wind, strong current, rain etc.

A major problem for users of conventional makeshift net rigs is the occurrence of tangles. Tangles in the net rig can result from a number of different variables. Because the user of a net rig is typically required to anchor the net rig with four or more suitable anchors, even a directional shift in the water current can cause the net rig to tangle. Optimal use of the net rig also requires that at least two users be present for deployment to substantially simultaneously "throw" the anchors on each corner of the rig, in order to achieve a taught net. Three users are often necessary for a net rig deployment, especially in areas of high water current. The third user is needed to drive the boat against the current while the other two users deploy the net.

Deploying the net rig in deeper water also proves problematic for the user because of the amount of time it takes for the anchors to reach the bottom of the water. The delay in the anchors falling to the bottom causes slackness in the net rig. This causes the decoys to eventually begin bumping into one another, and the decoys in the net rig are no longer providing a true appearance of actual waterfowl. Because of the loose construction of the fishing net, the net rig can evolve into an hourglass shape if the anchors are not properly set. Additionally, users that hunt waterfowl in areas that are affected by tidal changes often must expend considerable effort to re-set the net rig as the water currents and tide shifts occur. This consumes additional time for a user, as the user must forego hunting until the net rig can be readjusted.

In addition, because the decoys are attached to the net at both ends of the decoy keel, they are unable to adjust to changing wind, water currents, and directions. Also, the nylon or monofilament mesh on the commercial fishing net has large openings in it. The large openings are problematic because the decoy can become stuck in various configurations when the decoy bills, or zip ties become caught in the netting. This can also require the user to expend additional time and labor fixing individual decoys prior to or during deployment, as well as having to tediously repair snags in the net. These issues can prove to be difficult, especially during cold, windy, and wet weather.

Hunting with a trained dog is also a major aspect of waterfowl hunting for many decoy users. Users often deploy hunting dogs to swim out towards the duck after it has been shot, in order to retrieve the duck for the hunter. When a duck has been shot, it can fall into the water, often near or within the duck decoy "spread." The problem with the conventional makeshift net rig is that the dog risks being caught in the larger mesh openings of the nylon or monofilament fishing net if the duck falls near or into the net rig. This can prove fatal to the dog. Many hunters refuse to use, or are unable to use a makeshift net rig because of this danger alone.

While each of the above described devices and methods may be suitable on occasion for the particular condition to which they address, they are not suitable for reducing or eliminating the various problems and issues associated with their decoy use.

Hunting for waterfowl in open water can be a challenge to the decoy user, for many reasons. One of the major challenges is simply the fact that the user is often required to display a large number of decoys to attract attention from the passing waterfowl. Such a display can include anywhere from two dozen to ten dozen decoys. Each decoy is built to approximate the size of the true duck it represents. Multiple decoys can occupy a significant amount of square footage, and are cumbersome for the user to handle, store, transport, deploy, and remove from the water.

Working to display dozens of decoys on the open water is both grueling and time consuming, especially in colder temperatures. Duck hunting is often done in cold, inclement weather. Duck hunting season is generally held during the late fall and winter months. The hunter must use his hands as he deploys the decoys to the open water. Use of one's hands numbed by the cold weather can be difficult and painful. Users generally set up decoys on the water for their hunt in the early morning darkness. Strong water currents and high wind can make for good duck hunting conditions, but they can also create difficult conditions for deploying a conventional makeshift net rig and preventing entanglements. When an entanglement occurs, the user is required to make extensive use of their hands, wrists and fingers, which are often wet and numb when the weather is cold.

Whether the user deploys a single decoy setup, longline rig, jerk rig, or makeshift net rig, net and decoy entanglement is inevitable and undesired, as explained above. The bills and tails of the decoys can easily become wrapped up and tangled in any type of rigging currently being used by hunters. These methods increase the time required to deploy the decoys, the time to untangle them, and the time to remove them from the water.

The conventional makeshift net rig's propensity for entanglement also makes it difficult to store because the decoys cannot be easily removed. The decoys are zip tied tightly to the nylon or monofilament netting on the net rig, so the user typically leaves them on the fish netting when transporting and storing the net rig. As a result, decoys tend to bump into each other and are prone to paint chipping and discoloration. Removal of the decoys for storage is time consuming and difficult. Thus, the decoys on a conventional makeshift net rig generally do not receive the same care as those used on an individual decoy rig. It follows that the decoys used on a net rig frequently need to be repainted or replaced.

Methods and apparatuses to provide a cohesive, efficient, and safe method for organizing multiple decoys into a tighter configuration on the water, and for deploying them to, and removing them from the water are not known, but would be highly advantageous.

BRIEF SUMMARY

In view of the foregoing problems and disadvantages inherent in the known types of waterfowl decoy display rigs, the apparatuses, systems and methods according to aspects of the present disclosure significantly depart from the known designs, and, in so doing, provide a new decoy display device and decoy device deployment methods developed for the purpose of more efficiently deploying and displaying at least dozens of decoys in a tight, realistic configuration on the water, while helping to reduce time, tangles, difficulty, and danger. Aspects of the present disclosure also make removal from the water and storage easier for the user.

The general purpose of the present invention, which will be described subsequently in greater detail, is to provide a new waterfowl decoy display raft that has many of the advantages of the conventional makeshift net rig mentioned heretofore with many novel features resulting in a new duck decoy display device, which is not anticipated, rendered obvious, suggested, or even implied by any of the prior duck decoy display rigs, either alone or in any combination thereof. It will be understood that the waterfowl decoys generally used (and shown in the FIGs herein, particularly in FIGS. 5, 8 and 9) are characterized as a migratory waterfowl, such as a duck. However, other any and all types of waterfowl or other decoys are contemplated.

There has thus been outlined, rather broadly, the more important features of the present apparatuses and methods in order that the detailed description thereof may be better understood, and in order that the present contribution to the art may be better appreciated. There are additional features that will be described hereinafter and that will form the subject matter of the claims appended hereto.

A primary object of the present invention is to provide a decoy display device that will overcome the shortcomings of the prior decoy display devices used by hunters.

A second object is to provide a more alluring, effective display of decoys, to increase the user's ability to attract overflying waterfowl.

Another object is to provide a more efficient, time saving, and easier to use device to display multiple decoys in a tight configuration floating on the water.

Another object is to provide a decoy display device that is an improvement upon conventional makeshift net rigs.

Another object is to provide a more tangle-free device for the user.

An additional object is to provide the user with a decoy display device that helps eliminate the requirement of using four or more anchors.

An additional object is to provide the hunter with a way to deploy dozens of decoys using only one anchor.

An additional object is to provide the user with a multiple decoy display device that can be used without the requirement of at least two users being present to deploy same.

An additional object is to allow the user the ability to attach multiple apparatuses (arrays), longlines and other attachments by use of the grommets located around the perimeter of the present invention.

A further object is to provide users with a safer method of decoy display when using retrieving dogs in the open water.

A further object is to provide the user with a decoy display device that reduces the strain upon hands, wrists, and fingers that become wet and numb.

A further object is to provide the user with a device that facilitates removal of decoys for preservation, neater storage, easier transport, etc.

According to one aspect, the present disclosure is directed to a method for attracting and/or repelling animals comprising the step of deploying an apparatus. According to one aspect, the apparatus comprises a platform comprising a material maintaining a substantially planar form and having a first side and a second side, and a plurality of attachment regions on at least one side of the material. The apparatus further comprises a fastener having a first fastener end and a second fastener end, wherein the first fastener end engages an attachment region on the material, and at least one object for attracting or repelling animals, with the object having at least one attachment point, wherein a second fastener end engages the object at the attachment point, thereby attaching the object to the material.

In a further aspect, the platform further comprises at least one handle.

In another aspect, the material is a flexible material.

In another aspect, the flexible material is semi-pervious to water.

In yet another aspect, the apparatus is deployed onto a body of water.

In still another aspect, the fastener comprises a swivel.

According to another aspect, the object has at least two attachment points.

In yet another aspect, the object is attached to at least two attachment regions on the flexible material.

In still another aspect, the platform further comprises at least one grommet.

In a further aspect, the object is attached to the material prior to deployment of the apparatus onto a body of water.

A still further aspect comprises the step of predictably orienting the objects relative to the platform.

In yet another aspect, one method further comprises the step of securing a line to the platform, preferably via at least one grommet, said line optionally comprising a weight.

In a still further aspect, one method further comprises the step of predictably orienting the apparatus in a body of water.

In yet another aspect, the platform is suspended at a desired distance beneath the surface of a body of water.

In yet another aspect, the apparatus is predictably oriented in a body of water in a substantially fixed location.

In a still further aspect, one method further comprises the step of retrieving the apparatus from a body of water.

In a further aspect, the flexible material is made from a material comprising plastic, rubber, or combination thereof.

In yet another aspect, the flexible material comprises polyester.

In a further aspect, the flexible material comprises vinyl coated polyester.

In yet another aspect, the object is a decoy.

In a further aspect, the decoy is a waterfowl decoy.

In yet another aspect, the decoy is a terrestrial animal decoy.

In still another aspect, the decoy is an inanimate object.

Aspects of the present disclosure are further directed to apparatuses for attracting or repelling animals. According to one aspect, the apparatus comprises a platform comprising a material having a first side and a second side, a plurality of attachment regions on at least one side of the material maintaining a substantially planar form, a fastener having a first fastener end and a second fastener end, wherein the first fastener end engages an attachment region on the material; and at least one object for attracting animals, said object having at least one attachment point, wherein a second fastener end engages the object at the attachment point, thereby attaching the object to the material.

Still further aspects of the present disclosure are directed to systems for storing an apparatus for attracting or repelling an animal comprising maintaining an apparatus for attracting or repelling an animal in a deployable state while said apparatus is in storage, with the apparatus comprising a platform comprising a material maintaining a substantially planar form and having a first side and a second side, a plurality of attachment regions on at least one side of the material, a fastener having a first fastener end and a second fastener end, wherein the first fastener end engages an attachment region on the material; and at least one object for attracting animals, said object having at least one attachment point, wherein a second fastener end engages the object at the attachment point, thereby attaching the object to the material, and wherein the object remains fastened to the platform during storage of the apparatus.

Those skilled in the art will further appreciate the advantages and superior features of the invention, together with other important aspects thereof upon reading the detailed description which follows in conjunction with the drawings. To the accomplishment of the above and related objects, aspects of this disclosure may be embodied in the form illustrated in the accompanying drawings, attention being called to the fact, however, that the drawings are illustrative only, and that changes may be made to specific construction and are illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

Figure 1:
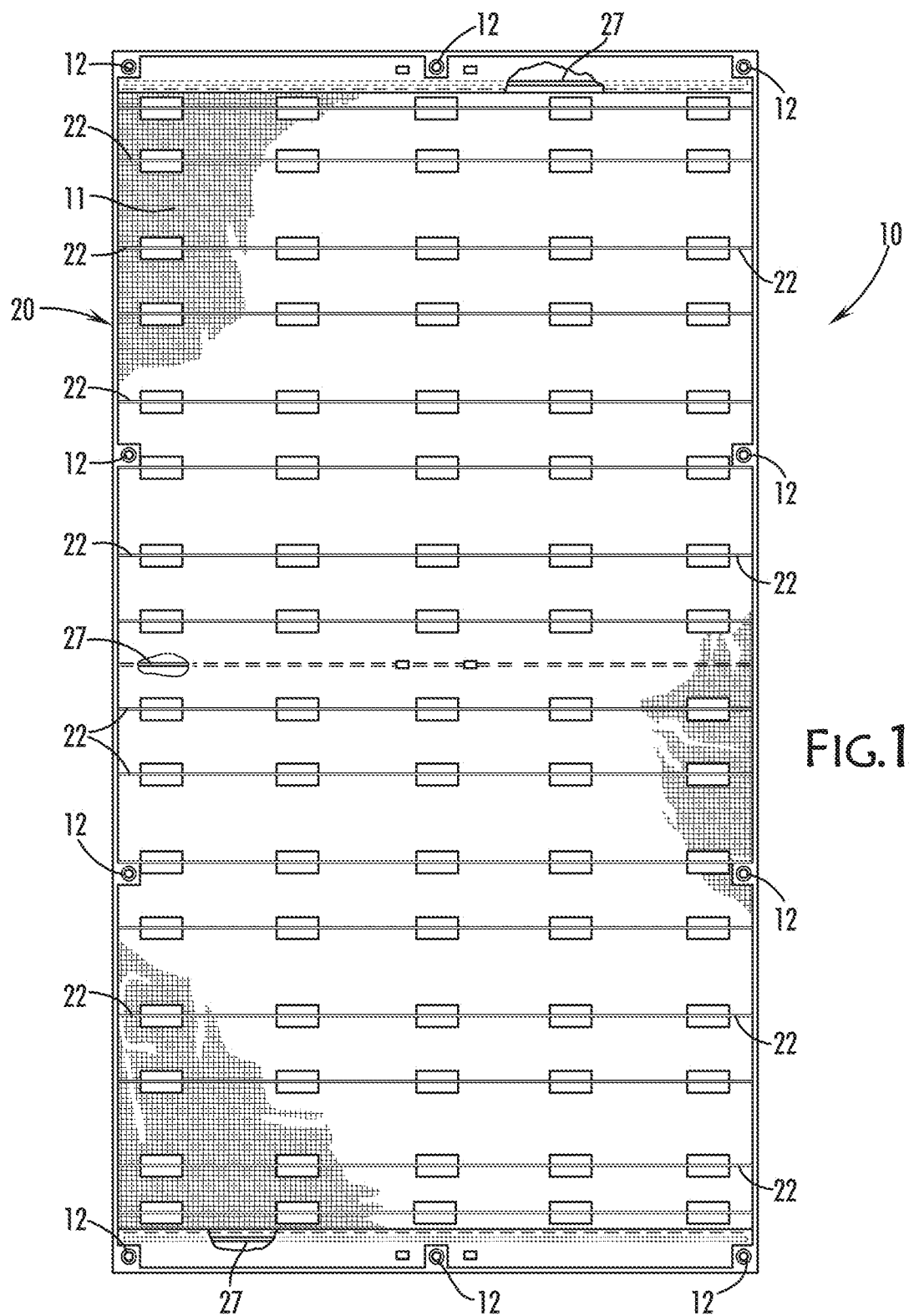
FIG. 1 is an overhead plan view of one aspect showing the top side.

Unlike known designs that employ a filamentous net, aspects of the present disclosure are designed as a semi-solid platform, or "raft", to predictably orient, and substantially maintain a predetermined taught formation of predictably configured decoys. Aspects of the present disclosure provide distinct advantages over the conventional and amorphous makeshift net rig that uses fishing net material, by instead comprising a platform that is able to retain its form in two dimensions. Stated another way, according to one aspect, the desirable material according to the present disclosure, and unlike a fishing net material, is capable of maintaining a substantially planar form when it is in its deployed state. According to one aspect, the platform is semi-pervious to water, and is made from a durable vinyl plastic fabric heavy enough to maintain its form beneath the water, while keeping the decoys floating in place on top of the water. According to another aspect, the semisolid platform is flexible. According to still another aspect, the platform comprises a mesh material.

Further aspects of the present apparatuses also provide the advantage of a single anchor point design that allows the user more flexibility and efficiency relative to storage, use, deployment, retrieval, removal and operation. While conventional makeshift net rigs require the need for multiple users to assist in deploying or tossing multiple anchors, according to further aspects, the presently disclosed apparatuses provide the user with the advantage of deployment and retrieval without need of assistance from another user. In moving or stagnant water, one anchor will keep the present invention taught and the decoys in place, although multiple anchors may be attached, if desired.

According to still further aspects, built in handles are provided, preferably at both ends of the underside of the semi-solid platform, and at its center, allowing the user to more efficiently deploy, retrieve and remove the Decoy Raft from the water.

In addition, according to further aspects, attachment mechanisms comprise fasteners, such as clips that in turn comprise a barrel swivel and clip design, that work in conjunction with the one anchor system, allowing the platform and decoys to predictably adjust to the wind and tide, whereby the raft and attached decoys are able to "weathervane," and face into the wind to hold their formation with a natural swimming appearance. The aforementioned clip, barrel swivel and clip, is comprised in part, of a clip and barrel swivel, not unlike a fishing line "snap swivel," which is easier for the user to efficiently attach to, and remove from an attachment region, such as, for example, paracord loops on the platform. In other words, when the decoy is attached to the attachment region on the platform, the barrel swivel allows the decoy to swivel 360 degrees, while still attached to the attachment region on the platform, in order to adjust to changes in the water current. According to one aspect, at the opposite end of the barrel swivel, a second clip can be used to attach to the keel of the decoy, or a singular clip may be designed that features the ability to attach to the paracord at one end and the decoy keel at the other end. This clip, barrel swivel and clip can be operated using a standard pair of gloves which are often used by hunters. By providing the user with clips, barrel swivels and clips that can be used to adjust the decoys, the present invention helps minimize the hunter's labor and effort in deploying decoys and reducing entanglements. The clip, barrel swivel and clip design allows the user to strategically move, remove and orient the decoys on the platform, whereas a conventional makeshift net rig does not provide for the same degree of ease and flexibility to adjust the decoys on the net in situ (because they are more permanently zip tied onto a fishing net).

It is to be understood that while the drawings show the spaced intervals in a paracord providing attachment regions for the fastener (clip), any type of attachment means (such as, for example, those attachment means that receive a clip or fastener) can be located at the attachment regions on the apparatus, including but not limited to hook and loop fastening systems, metal and non-metal fasteners, short bungee cords, carabiners, etc.

According to a further aspect, a decoy's keel is attached to one end of a clip, barrel swivel and clip, and then clipped at the other end to an attachment region on the platform, such as, for example, one of the small loops or "non-stitched openings" placed at spaced intervals along the paracord that is attached to the platform. According to one aspect, reinforcements, such as, for example, patches of denier/fabric are located on the platform material at each attachment region where the unstitched paracord is unattached and therefore "separates" from the platform material. These reinforcements serve at least a two-fold purpose: 1) to give the user a visual location of where to clip the decoys (especially helpful if it is dark when preparing to deploy the apparatus) and 2) to protect the platform material from damage should the decoy clips cause abrasions due to the constant motion of the decoys in the water. The reinforcements therefore help prevent the clips from chafing the platform material.

As shown in FIGS. 1-5, a paracord may be affixed to the platform material, (such as, for example by sewing, gluing, heat-sealing, etc.) into any useful configuration, such as, for example groups of multiple, and preferably two (2) parallel strips that oriented on the platform material in a predetermined and preselected fashion, such as, for example, about eight (8) inches apart from each other on the top or upper side of the platform material. According to one aspect, each paracord strip contains multiple loops or unstitched openings in the paracord running across the width of the platform material. In a further aspect, reinforcements are affixed/sewn to the platform material underneath each paracord loop. The purpose of having two paracord strips located at a desired distance from one another is to allow the user the option of staggering the decoys in a variety of configurations, as well as to orient the decoys point into a desired direction or angle. For example, the user can use the odd number positions on the top row and the even numbered positions on the second row. In addition, by having adjoining strips of paracord relative to one another, the user can lock a decoy in a desired direction that is different from other decoys on the platform material. The user does this by using the clip, swivel, and clip system. The decoy may then be attached on both ends of its keel and attaching the clip to a loop on each strip of paracord in that set. The next set of two (2) paracord strips are sewn, or otherwise affixed to the platform material, for example, approximately eleven (11) inches from the previous set so that the decoys are less likely to bump into each other in the water, and so that they can more freely adjust to the wind, tide, current, etc. It is understood that the attachment regions may be oriented and spaced on the platform in any desired configuration to allow for a predetermined and desired attachment of the decoys, and for otherwise desirably and predictably orienting the decoys onto the platform.

According to further aspects, the platform material comprises a plurality of grommets at predetermined locations, such as, for example, about its perimeter. According to one aspect, the grommets are inserted into the platform material, allowing for attaching additional rigs, including additional platforms. Instead of deploying an additional anchor for a longline, the hunter can simply attach the end of the longline to the platform using the built-in and incorporated grommets. Alternatively, the hunter can use the grommets to connect two (2) or more platforms together. According to a further aspect, a single anchor may be used to position multiple platforms that have been attached together. In addition, the user may also attach a bungee cord to one of the grommets and an anchor line and implement a "jerk rig" method.

The apparatuses disclosed herein can come in various sizes and shapes, but for illustration purposes, a 62 inch×144 inch rectangular platform can display approximately forty (40) decoys. If the user wishes to deploy more than one platform, the additional platform can be attached by simply using any useful attachment mechanism, such as, for example, a carabiner, etc. clipped to the grommets that are integrated into the platform. By pre-attaching (for example, prior to arriving at the hunting site) the decoys to the platform, the user can deploy up to forty (40) decoys in just a matter of a few minutes. Using forty (40) individually rigged decoys according to known methods would generally take the hunter at least about 30 minutes to deploy and retrieve, depending on the conditions and the water depth.

The present invention also provides the user with a more efficient method to retrieve the decoys at the conclusion of the activity. According to one aspect, the clip, barrel swivel and clip attachment design, along with the strategically placed handles, help provide the user with the ability to pull the entire platform into the boat or to shore while the decoys remain attached. The clip, barrel swivel and clip design also allows the user to more easily remove the decoys from the attachment regions on the platform, allowing for better storage (e.g. to prevent paint chipping and cracking) of the decoys. After removal of the decoys from the platform, the present invention allows the user to simply fold or roll up the platform for storage in a relatively small space. Or, if the user prefers and has adequate storage space, the present invention can be stored while the decoys remain attached.

According to one aspect, the platform comprises a cut of flat, vinyl plastic or vinyl coated polyester fabric with small mesh openings, with attachment regions comprising, for example, according to one aspect, multiple strips of attached paracord oriented in any configuration desired. The platform material comprises mesh features including but not limited to various weave designs and fabric counts, such as, for example 42×12; 17×11; 12×12, 11×11; 9×9; and 5×5, or, using standard mesh measurements, mesh openings including 1/16 inch mesh up to and including 3/8 inch mesh. According to one aspect, the paracord is oriented on the platform horizontally across the width of the platform, at predetermined and desired intervals apart. In a further aspect, the edges and corners of the platform are finished in denier or other fabric.

According to one aspect, a plurality of grommets (and preferably multiple grommets) surround the perimeter, or a location close to the perimeter, of the platform to allow for anchor attachment points, longline attachment, the ability to attach additional platforms to one another, and any other attachment as desired, etc. According to another aspect, preferred attachment mechanisms for securing the decoys to the platform include clips with and without barrel swivels. Other attachment mechanisms are contemplated, as would be readily understood by one skilled in the field. Useful attachment mechanism would preferably allow for realistic movement of the decoys relative to the platform material. However, the present disclosure contemplates attachments and attachment systems that fixedly position the decoys and restrict their movement relative to the platform material. In such aspects, the attachments may include Velcro-like material, or any attachments employing hook and loop mechanisms that would also work in a water environment, or any suitable fasteners, as would be readily understood.

Referring now descriptively to the drawings, in which similar reference characters denote similar elements throughout the several views, FIGS. 1 through 9 illustrate a platform 10, comprising a flat, rectangular body 20 comprised of a cut of a flexible platform material 11, such as a vinyl plastic mesh fabric. The drawing figures are not necessarily to scale in the interest of clarity and conciseness.

Figure 2:
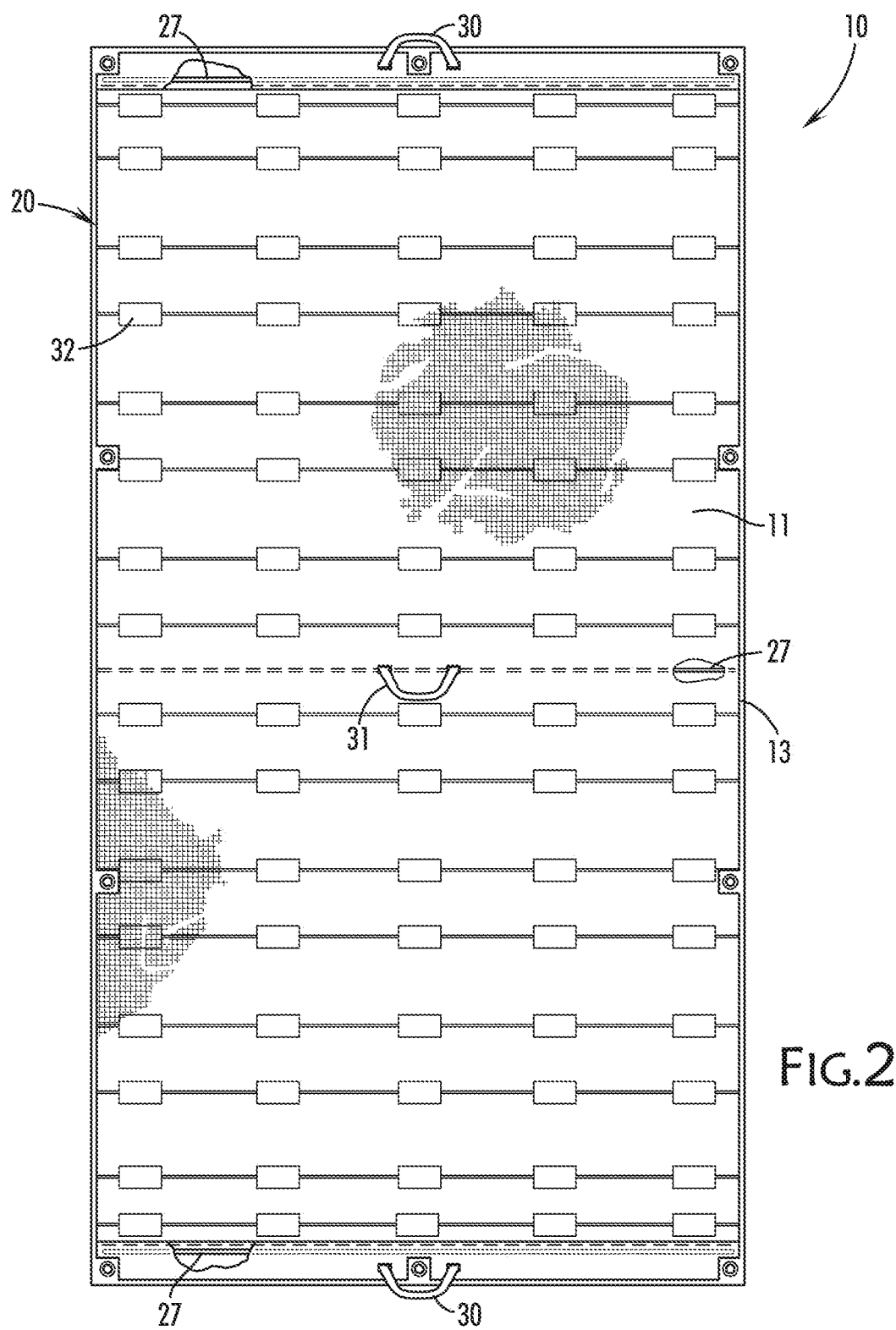
FIG. 2 is an overhead plan view of one aspect showing the underside.

As shown in FIGS. 1 and 2, the shape of the platform 10 is preferably a flat, rectangular shape. However, it can be appreciated by one who makes use of conventional waterfowl display rigs that the shape of the platform 10 can have various and virtually limitless geometrical shapes such as rectangular, square, triangular, oval, circular, and other well-known shapes, etc., and dimensions.

The flat, rectangular body 20 comprising the actual platform material 11 can be cut and constructed in various sizes. For illustration purposes only, and for explaining the functions of the present apparatuses, the actual size of the platform material 11 can be approximately 144 inches in length and approximately 62 inches in width. However, it can be appreciated that the flat, rectangular body 20 can have various sizes, both of a larger or smaller size, and both in length and width.

The flat, rectangular body 20 comprising the actual cut of platform material 11 may be constructed of vinyl coated polyester or other durable plastic material, including but not limited to various weave designs and fabric counts, such as, for example 42×12; 17×11; 12×12, 11×11; 9×9; and 5×5, or, using standard mesh measurements, mesh openings including 1/16 inch mesh up to and including 3/8 inch mesh. The small mesh size openings in the platform material help allow for water to pass through the present invention. The actual mesh size of the platform material 11 is significantly smaller than that used in commercial fishing nets and cast nets. It can be appreciated that the flat, rectangular body 20 may comprise any useful material with or without mesh features, although a mesh material is preferred for reasons stated above.

One particularly useful vinyl coated polyester material having desirable mesh characteristics is a black vinyl plastic that is vinyl coated and manufactured by Phifer, Inc. (Tuscaloosa, Ala.).

The flat, rectangular body 20 comprising the actual cut of platform material fabric 11 may be colored in any color, including, for example, black, brown, tan, green, blue, clear/transparent, etc. The flat, rectangular body 20 is preferably black in color, but it can be appreciated that other colors can be used.

Figure 6:
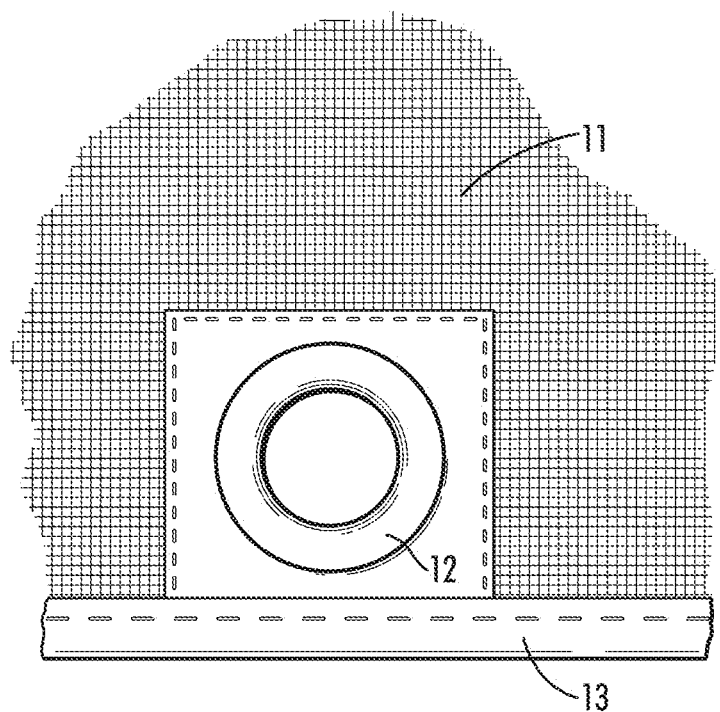
FIG. 6 is a close-up perspective view of a grommet inserted into the apparatus.

As shown in FIG. 6, the rectangular body 20 includes at least one grommet 12 inserted into the rectangular body 20. As shown in FIGS. 1 and 2, the grommets are inserted at desired intervals around the perimeter of the rectangular body 20. The grommets 12 may be spaced at desired regular or irregular interval(s). For illustration purposes only, and for explaining the functions of the present invention, the grommets 12 can be inserted at repeating intervals of thirty (30) inches to forty-six (46) inches. It can be appreciated that the distance between the grommets 12 can vary, including a placement either closer to, or further apart from, each other.

According to one aspect, the grommets 12 are preferably round in shape. It can be appreciated that the grommets 12 can come in any shapes, including, for example round, square, pentagonal, octagonal, etc. The size of the grommets 12 located along the perimeter of the platform may consist of various sizes, both in width and diameter. It can be appreciated that the grommets 12 may be comprised of any common material such as, for example, metal, plastic, rubber, ceramic, etc., and the grommets 12 may or may not comprise a coating material.

According to one aspect, the perimeter of the platform comprises denier 13 or other common fabric. The corners of the platform have denier 13, or other desired material that also houses the corner grommets 12.

As shown in FIG. 1, strips of paracord 22 are sewn into the platform material 11 and run substantially parallel across the upper side of the rectangular body 20 at spaced intervals. The distance between the strips of paracord 22 may vary, either longer or shorter, but for purposes of illustration, can run at eight (8) to eleven (11) inch intervals. The paracord strips 22 are preferably black in color, but it can be appreciated that other colors can be used.

Figure 3:
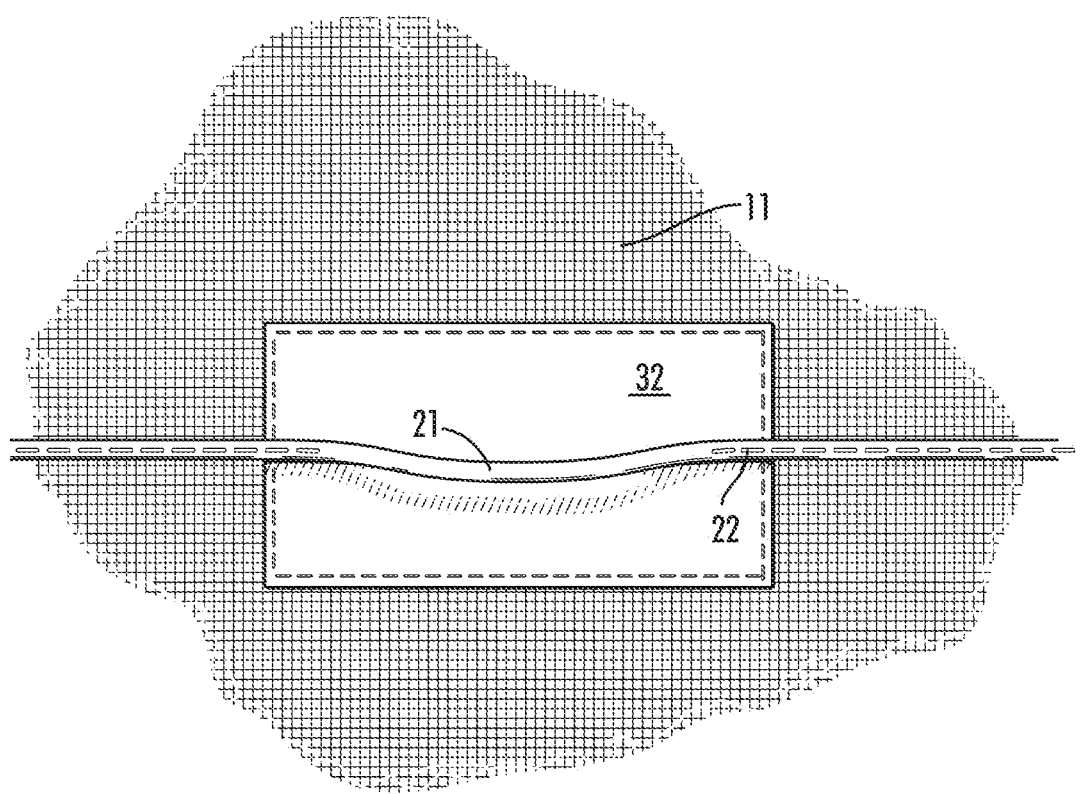
FIG. 3 is a close-up perspective view of a paracord running across the top of the apparatus, and the loop, or unstitched section of paracord, and the reinforcing section.
Figure 4:
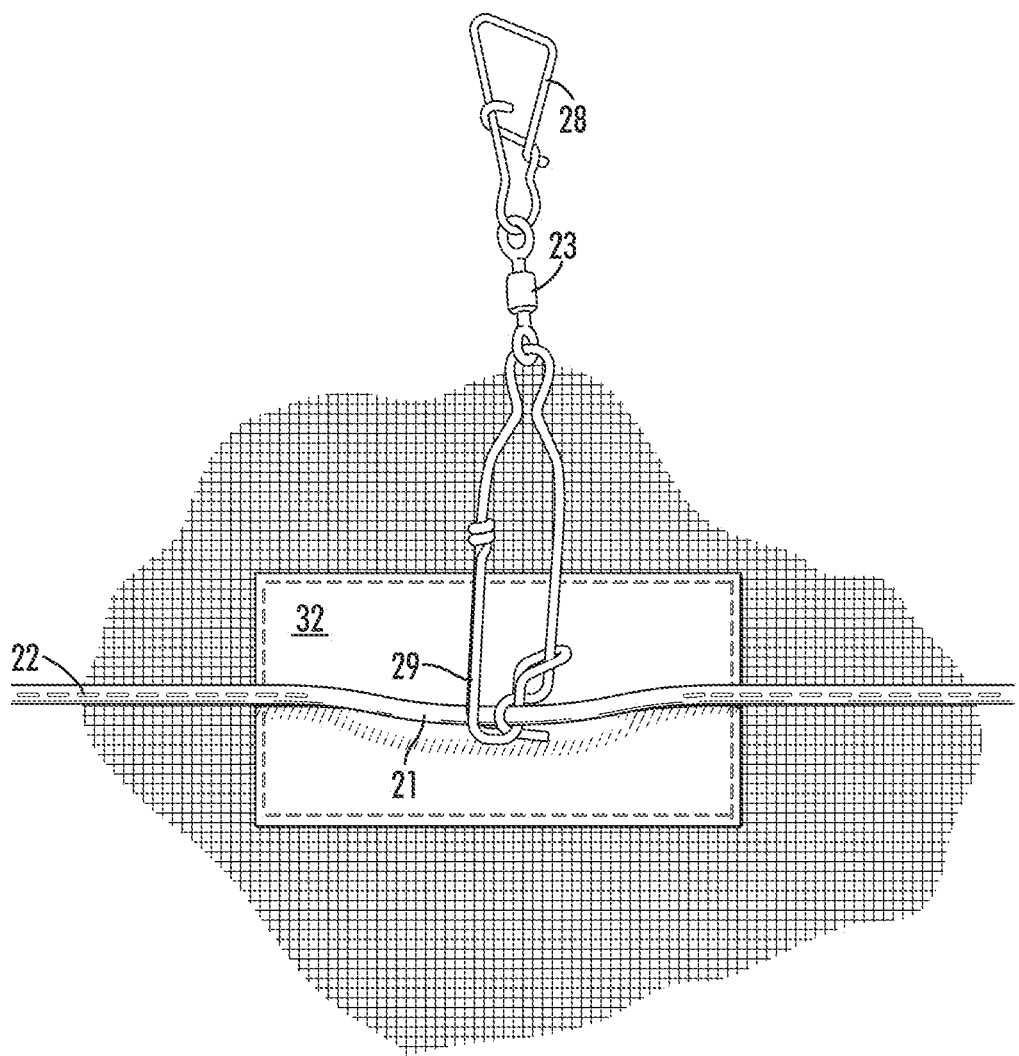
FIG. 4 is a close-up perspective view of an attaching mechanism attached to the loop or unstitched opening in the paracord.
Figure 5:
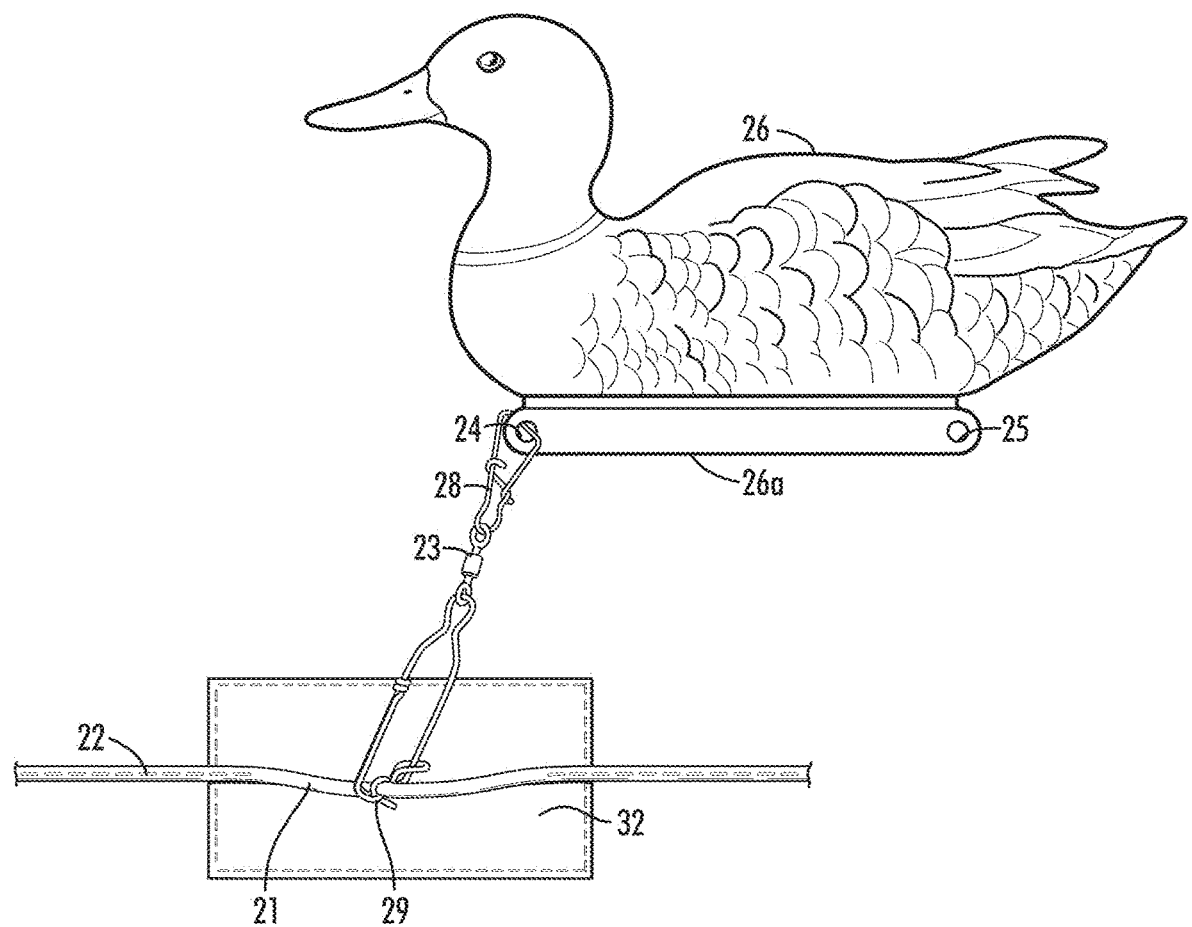
FIG. 5 is a close-up perspective view showing an attachment mechanism attached at a first end to the loop in the paracord, and attached at a second end to the front/head portion of a decoy keel.

As shown in FIGS. 3 through 5, loops (or non-stitched openings) 21 in the paracord 22, are provided for purposes of allowing a clip 29 to be attached to the paracord 22. There can be a reinforcement 32 of denier/fabric sewn into the platform material 11 at each location where the paracord loop 21 occurs on the platform material 11. The reinforcement 32 can comprise any desired material such as, for example, denier/fabric of any color or pattern, such as, for example, black, blue, brown, green, camouflage etc.

As shown in FIG. 5, the clip 29 attaches at a first end to the loop 21 in the paracord 22. The clip 29 at its second end is attached to a first end of a barrel swivel 23. The second end of the barrel swivel 23 is attached to another clip 28. This clip 28 is attached to the front end 24 or back end 25 of the keel 26a located underneath the decoy 26.

As shown in FIGS. 1, 2, 7, 8 and 9, near the perimeter (edges), and near the middle of the body 20, platform material 11, is manipulated, for example, folded over lengthwise and affixed to itself to form a channel through which a rod 27 is inserted. The rod 27 may comprise any useful material that is preferably strong and lightweight, such as, for example, plastic, vinyl, PVC, rubber, ceramic, wood, or other durable material, etc. The rod 27 is preferably comprised of a plastic such as PVC. It can be appreciated that the rod 27 may be comprised of any common material such as plastic or PVC pipe. It can be appreciated that the length of the rod 27 can vary, depending on the width or shape of the flat, rectangular body 20.

As shown in FIG. 2, handles 30, 31 are placed on the underside of the rectangular body 20. It is understood that any number of the handles 30, 31 may be also be located on the upperside or underside of the rectangular body 20 as desired. As shown, one handle 30 is placed at each end of the length of the rectangular body 20, and one handle 31 is placed in the middle underside of the rectangular body 20 of the present invention. As shown, all three handles are placed on the underside of the rectangular body 20, so as to not interfere with the paracord 22 and the attached decoys 26 on the top of the flat, rectangular body 20 of the present invention.

When it is desired to deploy the platform 10, the user attaches a clip 28 to the front opening 24 or rear opening 25 of the keel 26a underneath the decoy 26. The clip 28 is connected to a barrel swivel 23, which is connected to a clip 29. As shown in FIG. 5, the individual decoy 26 becomes attached to the rectangular body 20 by a clip 29 onto the loop 21 in the paracord 22. The user repeats this step for each individual decoy 26, and then attaches each individual clip 29 to the paracord 22 in each one of the desired paracord loops 21, on the top surface of the rectangular body 20, until they have the desired numbered of decoys 26 mounted on the platform 10.

Figure 7:
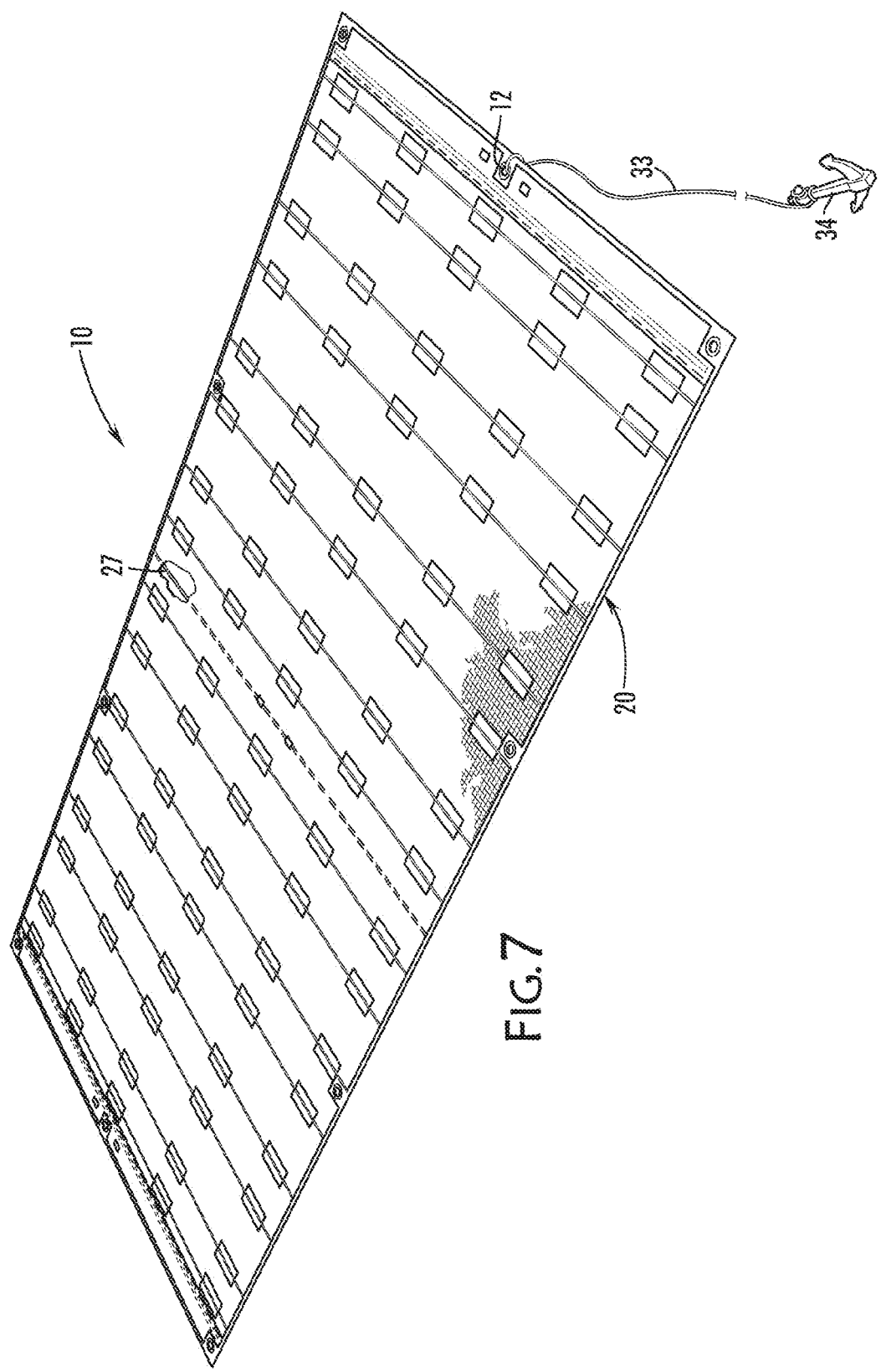
FIG. 7 is a perspective view of one aspect of the apparatus showing the top side, with an anchor line attached to a grommet.
Figure 8:
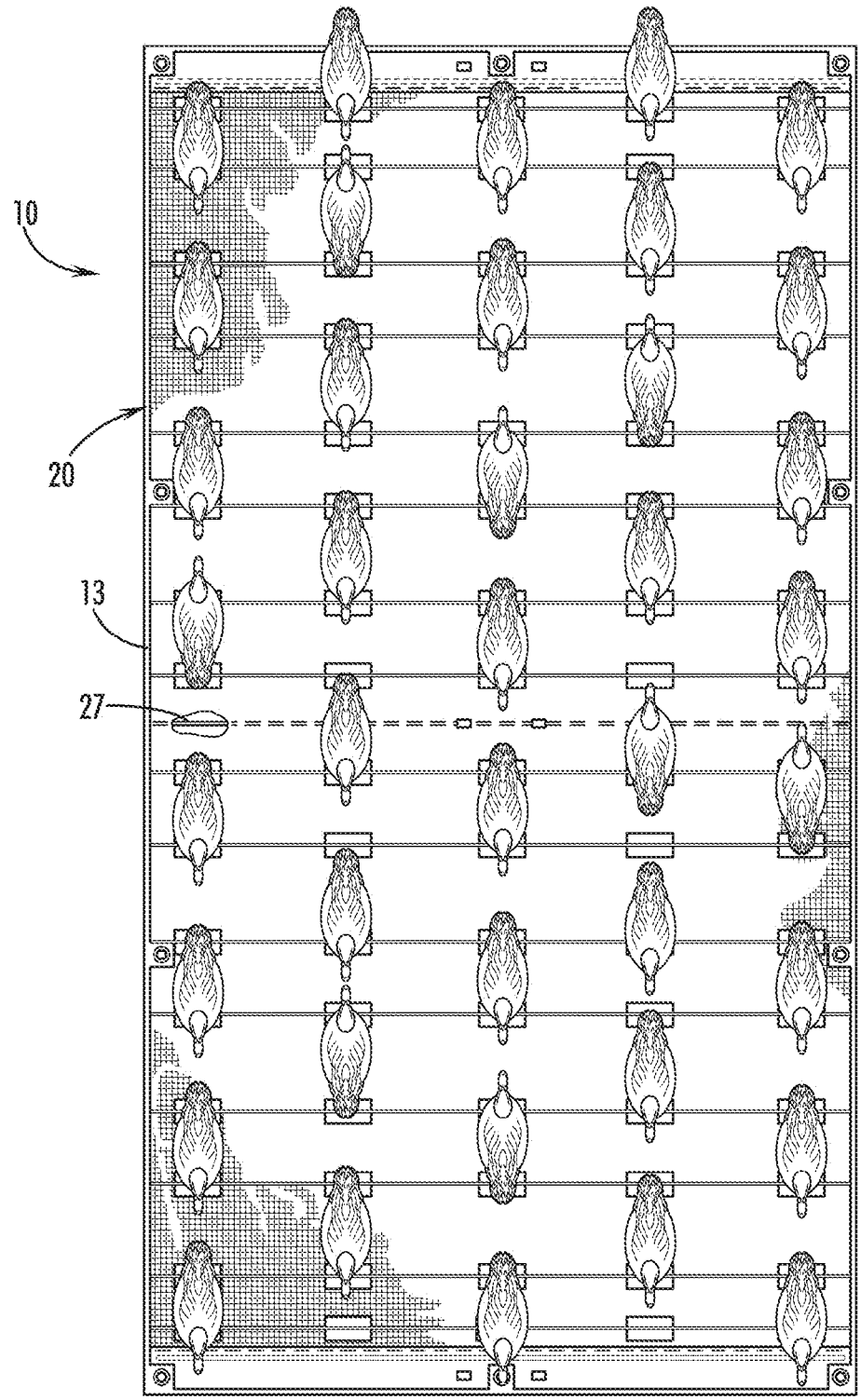
FIG. 8 is an overhead plan view showing the apparatus with decoys attached.
Figure 9:
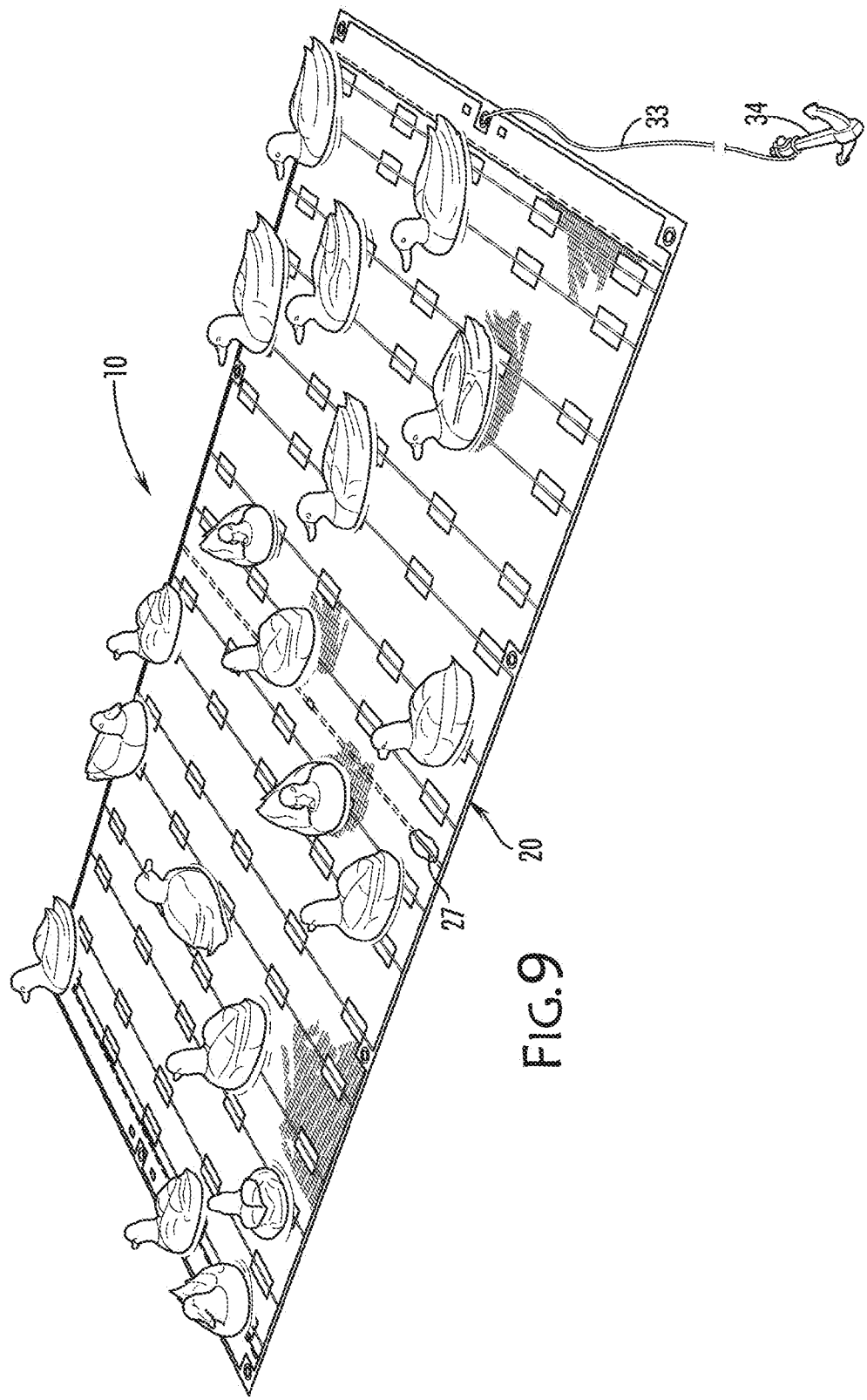
FIG. 9 is a perspective view of the present invention, showing the apparatus with decoys attached.

According to one aspect, and as shown in FIG. 7, the user attaches a suitable line 33 to the center grommet 12 located on either end (width) of the flat, rectangular body 20. At the opposite end of the line 33, the user attaches a suitable anchor 34. The user can then deploy the anchor 34 into the water.

If the user further desires to attach a device such as a longline, (or a second or more platform(s)) to a first platform, the device can be secured with a suitable cord or line (e.g. rope) to any of the grommets around the perimeter of the rectangular body. The user may also attach a bungee cord to a grommet and anchor rope to use the platform in a jerk rig method.

Following use of the platform, the user retrieves and removes the present invention from the water. As shown in FIG. 2, the user can use the underside handles 30 at each end of the rectangular body 20, and the handle 31 in the middle of the rectangular body 20 to pull the platform 10 from the water.

As to a further discussion of the manner of usage and operation of the present platform, the same should be apparent from the above description. Accordingly, no further discussion relating to the manner of usage and operation will be provided.

With respect to the above description, it is to be understood that the optimum dimensional relationships for the parts of the disclosed apparatuses include variations in size, materials, shape, color, form, function and manner of operation, assembly and use, and are deemed readily apparent to one skilled in the art, and all equivalent relationships to those illustrated in the drawings and described in the specification are intended to be encompassed by the present disclosure.

It is further understood that aspects of the present invention may be useful not only to attract animals in decoy-like fashion, but may also be useful in repelling unwanted animals from a particular location, (e.g. bodies of water near a golf course, or other populated or unpopulated public or private recreational park or site, etc.) either scenting the decoys with a predator's scent, or by employing decoys of an animal type, or other animate or inanimate object that is predatory to unwanted animals, or that otherwise repels or affects the behavior of unwanted animals by its presence and/or appearance.

Aspects of the present disclosure further contemplate methods, systems and apparatuses for also attracting and/or repelling animals that are terrestrial, as opposed to or in addition to being waterborne. As would be readily understood, to deploy the apparatuses of the present disclosure for terrestrial use, the attachment of the decoy object to the platform may require fasteners different from those used for waterborne deployment and use. Further, for terrestrial use, the decoys or other objects themselves need not be buoyant, for example. However, terrestrially-based decoys or other objects may need to be designed and fabricated to be "self-righting" or otherwise attached to remain erect or in a standing position, etc. as would be readily apparent to one skilled in the field. Nevertheless, by incorporating the appropriate fastening means and/or object design, many of the advantages that the methods, systems and apparatuses afford to water-borne uses would be available and realized for terrestrial-based uses, such as, for example, ease of deployment, retrieval and storage, as the decoys and/or other, objects could remain attached to the platform if desired.

Therefore, the foregoing is considered illustrative only of the principles disclosed herein. Further, since numerous modifications and changes will readily occur to those skilled in the art, it is not desired to limit the disclosure to the exact construction and operation shown and described, and accordingly, all suitable modifications and equivalents may be resorted to, falling within the scope of the invention.

What is claimed is:

1. A method for attracting or repelling animals comprising the step of:
deploying an apparatus to a deployed state, said apparatus comprising:
a semi-solid platform comprising a flexible material, said platform having a first side and a second side, said semi-solid platform maintaining a substantially planar form, said semi-solid platform being semi-pervious water;
a plurality of attachment regions on at least one side of the semi-solid platform;
a fastener having a first fastener end and a second fastener end, wherein the first fastener end engages one of the plurality of attachment regions on the flexible material; and
at least one object for attracting or repelling animals, said object having at least one attachment point, wherein the second fastener end of the fastener engages the object at the at least one attachment point, thereby attaching the object to the semi-solid platform;
suspending the semi-solid platform in a planar orientation at a desired distance beneath the surface of a body of water;

wherein the flexible material comprises a semi-solid mesh material;

wherein the flexible material is configured to maintain a substantially planar form at a desired distance beneath the surface of a body of water in the deployed state; and wherein the flexible material is not a net.

2. The method of claim 1, wherein said semi-solid mesh material comprises mesh openings ranging from about 1/16 in. to about 3/8 in.

3. The method of claim 1, further comprising the step of securing a line to the semi-solid platform, wherein said line comprises a weight.

4. An apparatus for attracting or repelling animals, said apparatus comprising:
- a semi-solid platform consisting of a flexible material, said semi-solid platform having a first side and a second side, said platform configured to maintain a substantially planar form, said semi-solid platform being semi-pervious to water;
- a plurality of attachment regions on at least one side of the material;
- a fastener having a first fastener end and a second fastener end, wherein the first fastener end directly engages one of the plurality of attachment regions on the flexible material; and
- at least one object for attracting animals, said at least one object comprises at least one attachment point, wherein the second fastener end engages the object at the at least one attachment point, thereby attaching the object to the flexible material;

wherein the flexible material comprises a semi-solid mesh material;

wherein the flexible material is configured to maintain a substantially planar form in two dimensions at a desired distance beneath the surface of a body of water when said apparatus is deployed in a body of water; and wherein the flexible material is not a net.

5. The apparatus of claim 4, wherein the apparatus further comprises at least one handle.

6. The apparatus of claim 4, wherein said semi-solid mesh material comprising mesh openings ranging from about 1/16 in. to about 3/8 in.

7. The apparatus of claim 6, wherein the fastener comprises a swivel.

8. The apparatus of claim 4, wherein the at least one object comprises two attachment points.

9. The apparatus of claim 4, wherein the object is attached to at least two of the plurality of attachment regions on the flexible material.

10. The apparatus of claim 6, wherein the apparatus further comprises at least one grommet.

11. The apparatus of claim 4, wherein the object is attached to the flexible material prior to deployment of the apparatus onto a body of water.

12. The apparatus of claim 4, wherein the apparatus is configured to be predictably oriented in a body of water.

13. The apparatus of claim 4, wherein the apparatus is configured to be predictably oriented in a body of water in a substantially fixed location.

14. The apparatus of claim 4, wherein the flexible material is made from a material comprising at least one of: plastic, rubber, vinyl coated polyester or combinations thereof.

15. The apparatus of claim 4, wherein the material comprises vinyl coated polyester.

16. The apparatus of claim 4, wherein the object is a decoy.

17. The apparatus of claim 4, wherein the apparatus is configured to be maintained in a deployable state during storage with said object fastened to said platform during storage.

* * * * *